United States Patent Office 3,533,809
Patented Oct. 13, 1970

3,533,809
PHOSPHATE GLUTARALDEHYDE TANNING
OF EDIBLE COLLAGEN CASING
Mauj A. Cohly, Catlin, and James W. Sanner, Danville,
Ill., assignors to Tee-Pak, Inc., Chicago, Ill.
Filed Nov. 20, 1967, Ser. No. 684,218
Int. Cl. H22c 13/00; D01f 9/04; B29d 23/04
U.S. Cl. 99—176                                9 Claims

ABSTRACT OF THE DISCLOSURE

An edible sausage casing having improved strength, bite, stuffing, linking, and cooking characteristics is prepared from collagen. Collagen is preferably obtained from animal hides which are dehaired and split to recover a collagen containing corium layer. The corium layer is ground into fine particles, formed into a slurry, and swollen with weak acid to produce an extrudable collagen paste or slurry having a solids content of about 2–6 percent. The slurry is extruded through an annular die, coagulated with ammonium sulfate or sodium sulfate or a sodium acid phosphate and tanned or hardened in a bath containing a small amount of glutaraldehyde and a substantial amount of a sodium acid phosphate. The tanned casing is washed and plasticized with an aqueous solution of glycerin or other suitable plasticizer and then dried and reeled. The casing is eventually shirred on a commercial shirring machine for delivery to the meat packer in shirred form.

BACKGROUND OF THE INVENTION

Natural casing are prepared from the intestines of various edible animals, particularly cattle, hogs, and sheep. The intestines are removed from the slaughtered animal and are thoroughly cleaned by processes well known in the art. Natural casings which have been thoroughly cleaned are stuffed with various sausage meat compositions and formed into sausage links in preparation for cooking. The sausages which are thus formed are cooked by the consumer and the sausage casings eaten with the cooked sausage. In the preparation of certain smoked or precooked sausages, such as frankfurters and the like, the sausage is cooked or smoked or otherwise processed by the meatpacker to render it edible without further treatment by the consumer.

Prior to about 1925, substantially all sausage casings were natural casings prepared from animal intestines. Since that time, there have been developed several types of synthetic sausage casings, primarily of a regenerated cellulose, which are used in the preparation of the major portion of sausages which are made and sold today. Cellulose casings are used in the preparation of large sausages, such a bolognas, salamis, and the like, and are removed from the sausage by the consumer at the time of final preparation for eating. Regenerated cellulose casings are also used in the preparation of frankfurter sausages wherein the casing is stuffed with sausage emulsion, linked, smoked, and cooked, and the casing removed from the finished sausage prior to delivery to the customer.

Regenerated cellulose casings have not been satisfactory for the processing of pork sausages inasmuch as cellulose is not edible with the sausage and does not transmit the fat which is released from the sausage during cooking and does not shrink with the sausage during cooking. As a result, there has been some demand for an artificial sausage casing which is edible and which has the properties desired in a casing to be used in the processing of pork sausages.

Over a period of many years, synthetic sausage casings have been prepared from animal collagen. Casings made of collagen have been prepared by processing animal hide to break the collagen into a fibrous structure and extrude the collagen fibers in the form of a doughy mass to produce tubular casings. The casings which have been prepared in this manner have been hardened with formaldehyde and have been used as a removable casing for processing various sausages. These casings have not been edible even though collagen itself is edible material. More recently, edible sausage casings of collagen have been prepared and sold in commercial quantities. In the manufacture of edible collagen casings, considerable emphasis has been placed on the necessity for using collagen source materials which have not been subjected to a liming treatment. In fact, a number of recent patents describing the production of collagen casings have indicated that it is absolutely necessary to start with an unlimed collagen source material if an edible casing is to be obtained. While the use of unlimed collagen as a starting material has certain advantages, it has the substantial disadvantage of requiring a more severe mechanical treatment for removal of hair and the epidermal layer from the hides from which the collagen is obtained.

In the copending patent application of Robert D. Talty and Mauj A. Cohly, Ser. No. 442,885, filed Mar. 26, 1965, now U.S. Pat. No. 3,408,918 a process is described in which edible collagen casings are prepared from limed hide collagen. In that process, animal collagen is obtained from limed hides which are subsequently subjected to an acid de-liming process. In the copending patent application of Robert D. Talty, Ser. No. 471,645, filed Sept. 13, 1965, now U.S. Pat. No. 3,425,846 a process is described for the preparation of edible collagen casings from limed hides which may be subjected to an acid deliming process or which may be converted directly into a collagen paste and casings formed without the acid deliming step, provided that the collagen is processed into casing at a sufficiently high speed.

In the preparation of edible collagen casings, hide collagen is converted into a finely-divided fibrillar form and extruded in the form of a dilute collagen slurry, e.g., 2–6 percent collagen content. The extruded collagen is passed into a sodium sulfate and/or ammonium sulfate coagulating bath which dehydrates the collagen slurry and forms a coherent collagen film. At this stage in the processing, however, the salt-coagulated collagen film can be handled but will revert to a thin slurry upon further contact with water. It is, therefore, necessary to harden or tan the extruded collagen film to permit further processing of the film and to provide the film with sufficient strength for use as a sausage casing. A satisfactory tanning process must utilize a tanning agent which is very rapid in tanning action and completely non-toxic in the form in which it is present in the finished casing and must produce a casing of sufficient strength to be stuffed with sausage meat, linked, packaged, and finally cooked.

In the preparation of edible collagen casings, one of the most successful methods of hardening or tanning the casing utilizes an alum tanning bath or a bath containing an aluminum salt complex, such as a citrato complex, at a pH suitable for tanning. When casings are tanned or hardened using an aluminum tanning bath, the tanned casing is generally quite strong and easy to handle during processing, reeling, shirring, packaging, etc., but often exhibits certain deficiencies in handling at the time of stuffing with sausage emulsion or during cooking. Aluminum tanned casings generally are somewhat stiff and are difficult to link after stuffing. Also, it has been found that aluminum tanned casings often tend to split during frying of sausages stuffed therein and thus are not entirely satisfactory for the preparation of pork sausages.

In the copending patent application of Henry J. Rose, Ser. No. 467,627, filed June 28, 1965, now U.S. Pat. No. 3,413,130 a process is described in which collagen casing is tanned using a solution of glutaraldehyde. It is possible to produce a casing of suitable properties by tanning the casing with glutaraldehyde, but it has been found that glutaraldehyde tends to interact with the ammonium sulfate used in the coagulating bath to produce a brown color in the casing. It has also been found that glutaraldehyde, under conditions previously used for tanning, tends to form brown colored polymerization or oxidation products after several hours' exposure to atmosphere.

STATEMENT OF OBJECTS AND FEATURES OF THE INVENTION

It is, therefore, one object of this invention to provide a new and improved process for the preparation of edible collagen casings from animal collagen source materials utilizing a novel coagulation and tanning procedure.

Another object of this invention is to provide a new and improved edible collagen casing prepared from animal collagen materials and coagulated and tanned in a novel system of coagulation and tanning baths.

A feature of this invention is the provision of an improved process for preparing edible collagen casings from animal collagen materials in which the collagen is extruded as a paste through an annular die into a coagulating bath and hardened in a tanning bath comprising a solution of glutaraldehyde in an aqueous solution of an acided phosphate salt.

Another feature of this invention is the provision of a new and improved edible collagen casing prepared from animal collagen material extruded into a coagaulating bath and hardened by treatment with a dilute solution of glutaraldehyde in an aqueous acidic solution of a phosphate salt.

Other objects and features of this invention will become apparent from time to time throughout the specification and claims as hereinafter related.

SUMMARY OF THE INVENTION

This invention is based upon the discovery that edible collagen casings can be prepared using animal collagen materials converted into a suitable paste or slurry for extrusion as a hollow tube, and coagulated in a salt coagulation bath, and then tanned or hardened in a tanning solution consisting of a dilute solution of glutaraldehyde in an acidic aqueous solution of a phosphate salt. The casing which is prepared has improved stuffing, linking, and cooking properties and is free from the brown discoloration usually obtained in glutaraldehyde tanning of collagen.

The collagen used in this process is preferably hide collagen and may be obtained from either limed or unlimed hides. The animal hide is treated to remove the blood quickly and is frozen or salt cured or immediately treated with a lime-containing solution to at least partially dehair the hide. The liming step (of the fresh, frozen, or salt cured hide) is preferably carried out in less than 48 hours. Alternatively, the hide may be treated with a dilute non-toxic acid after liming to remove the unreacted calcium from the collagen. The hide is then washed, dehaired, ground at a temperature less than 20° C., and swollen with a non-toxic acid at a pH of about 2.5–3.5. These steps are preferably carried out rapidly, viz., in less than 48 hours, more preferably less than 12 hours.

When the hide is limed, washed, ground, and swollen, a slurry is produced which is extruded through an annular die into a coagulating bath of sodium sulfate or ammonium sulfate or a neutral or slightly acidic phosphate salt solution, to form a salt coagulated tubular casing. The casing is then tanned by passing it through a tanning solution consisting of a dilute solution of glutaraldehyde in an acidic aqueous solution of a phosphate salt. The tanned casing is washed, plasticized, and then dried, reeled, and finally shirred and packaged.

The casing which is produced by this process performs well in stuffing, linking, and cooking and is free from discoloration obtained in prior art procedures for glutaraldehyde tanning of collagen. A similar improvement in casing properties is obtained when collagen slurries prepared from unlimed hides or enzymatically dehaired hides are extruded, coagulated, and tanned as described above.

BRIEF DESCRIPTION OF THE DRAWINGS

The process for preparation of casings in accordance with this invention will be understood more fully by reference to the following description and the accompanying drawings, in which.

DESCRIPTION OF THE PREFERRED EMBODIMENTS

Figure 1:
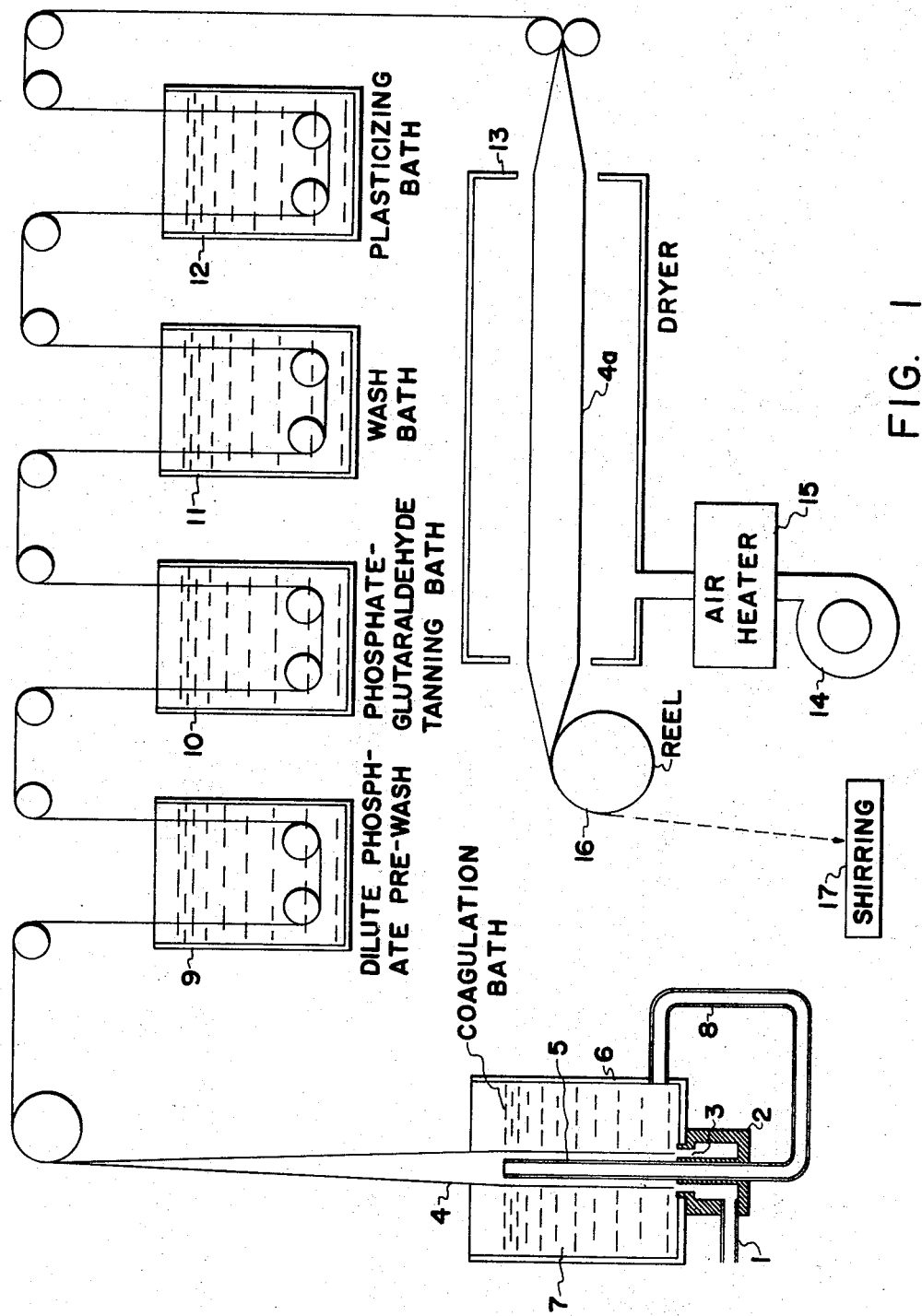
FIG. 1 is a flow diagram illustrating schematically the more impartant steps in the extrusion, tanning, and processing of edible collagen casings.
Figure 2:
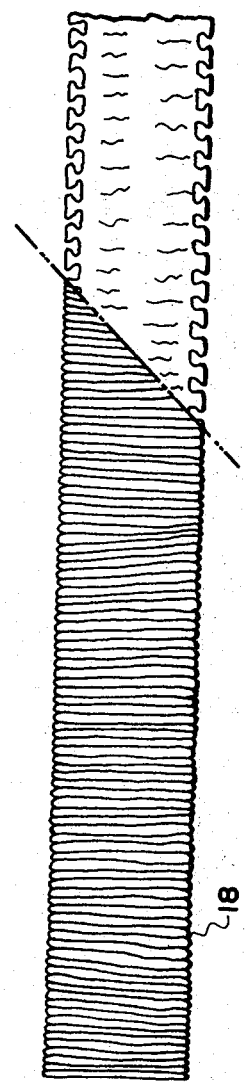
FIG. 2 is an extruded edible collagen casing prepared in accordance with this invention as processed in a shirred form.

This invention is applicable to the preparation of edible collagen casing from animal collagen sources such as hide collagen, tendon collagen, etc. As a practical matter, hide collagen is generally preferred both for reasons of economy and superiority of product.

In a preferred form of the process, animal hides, preferably steer or cattle hides, are cut into suitable pieces (hide trimmings may also be used) and are treated with a suitable lime solution for removal of hair. The hide may also be limed before cutting into small pieces if desired. The lime solution is preferably a solution containing excess solid lime, $Ca(OH)_2$, sodium sulfhydrate, NaSH, and, optionally, dimethylamine sulfate, $(CH_3)_2(NH)_2SO_4$. After treatment in such a solution for a period of less than two days (3–12 hours or less is preferred), the hides are removed and washed. After washing, the hides are split or otherwise mechanically abraded to remove the epidermal layer and any remaining hair.

The hides which are thus prepared are washed in a solution containing a non-toxic acid, such as an edible grade lactic acid, to clean the hides further and to neutralize excess lime in the hides. This cleaning and neutralization step is preferably carried out in accordance with the procedure described in the copending application of Robert D. Talty and Mauj A. Cohly, Ser. No. 442,885, filed Mar. 26, 1965. The hides are then cut into small pieces, ground into particles of very small size to produce an aqueous slurry having a collagen content in the range from about 2–6 percent, preferably about 3.5–5.0 percent. The collagen is maintained at a temperature less than about 20° C. (preferably less than 10° C.) during the grinding, by repeated addition of ice to the mixture. The collagen slurry which is thus prepared is treated with a dilute solution of weak acid to swell and burst the collagen fibers as previously described. The washing, dehairing, grinding, and acid swelling of the collagen are carried out in a relatively short time, generally less than about 48 hours.

The swollen collagen slurry is then extruded through an annular die to produce a thin walled tubular product suitable for use as a sausage casing after tanning and further processing. In order to obtain maximum strength in the product casing, the collagen slurry is preferably extruded through a die having counter rotating inner and/or outer parts which are well known in the prior art in the preparation of collagen casings, vide Becker U.S. Pat. 2,046,541.

The collagen slurry is extruded through the die into a coagulating bath consisting of a concentrated solution of sodium sulfate and/or ammonium sulfate or an acid phosphate salt. The thin walled collagen tube which is formed in the coagulating bath is then passed into a tanning bath consisting of a dilute solution of glutaraldehyde in a relatively concentrated aqueous solution of an acid phosphate salt. If desired, the casing may be subjected to a preliminary washing step prior to tanning by use of a relatively dilute solution of an acid phosphate salt which removes excess amounts of the coagulating salt from the casing without rendering the casing too weak for the tanning and subsequent processing steps. After tanning, the casing is passed through a wash bath and then through a plasticizing bath consisting of an aqueous solution of glycerin or other suitable plasticizing material, such as triethylene glycol, propylene glycol, dipropylene glycol, sorbitol, etc. The casings pass from the plasticizing bath through a dryer where the casing is inflated with air or other gas and dried by circulation of heated air thereover. The casing may be shirred directly out of the dryer or may be rolled up on reels and subsequently shirred. Shirring directly out of the dryer has the advantage that it is easier to maintain the casing inflated but has the disadvantage that the shirring machines are generally capable of operation at a substantially higher rate of speed than the rate of extrusion of casing in the process. The casing may be shirred on shirring machines of the type used in the shirring of regenerated cellulose casings, such as those shown in U.S. Pats. 2,722,714, 2,722,715, 2,723,201 and 3,122,517.

In FIG. 1 of the drawings, the steps from extrusion through reeling or shirring are illustrated schematically in slightly more detail. The collagen slurry is introduced through inlet conduit 1 into a die 2 having an annular die outlet 3 through which casing 4 is extruded. The die 2 has innertube 5 which extends upwardly within the extruded casing to remove coagulating bath from within the extruded casing. Die 2 is preferably a die having a pair of counter-rotating members which give the collagen fibers or fibrils a mixed orientation and thus produce a stronger casing. The die 2 is located at the bottom of containers 6 which contains coagulating bath 7 (a concentrated solution of sodium sulfate or ammonium sulfate or an acid phosphate salt). Coagulating bath 7 is circulated through conduit 8 from tube 5 for removal of the coagulating bath from inside the extruded casing. Casing 4 which is coagulated in bath 7 passes over a series of rollers and is directed through a dilute acid phosphate solution prewash 9. From the prewash 9, the casing passes into a phosphate-glutaraldehyde tanning bath 10. Tanning bath 10 consists of an aqueous solution of glutaraldehyde and an acid phosphate salt. The gluteraldehyde is preferably present in a relatively small quantity, viz. 0.01–2.0 percent. The glutaraldehyde is in solution in a concentrated solution, about 20 percent, of an acid phosphate salt, such as monosodium dihydrogen phosphate. The glutaraldehyde acid phosphate salt solution used for tanning is preferably maintained at a pH of about 4–6.

From the tanning bath 10, the casing passes through a wash bath 11 where unreacted tanning reagent is washed out of the casing. The casing is then passed through a plasticizing bath 12 which consists of a solution of glycerin in water.

From the plasticizing bath 12, the casing passes through dryer 13 where it is inflated and dried with the aid of air circulated by fan or blower 14 through air heater 15. After leaving dryer 13, the casing is preferably rolled up on reel 16 and is eventually shirred on a commercial shirring machine of the type used in the shirring of regenerated cellulose sausage casings, as noted above. If desired, the casing may be passed directly to a shirring machine shown diagrammatically as 17.

Figure 3:
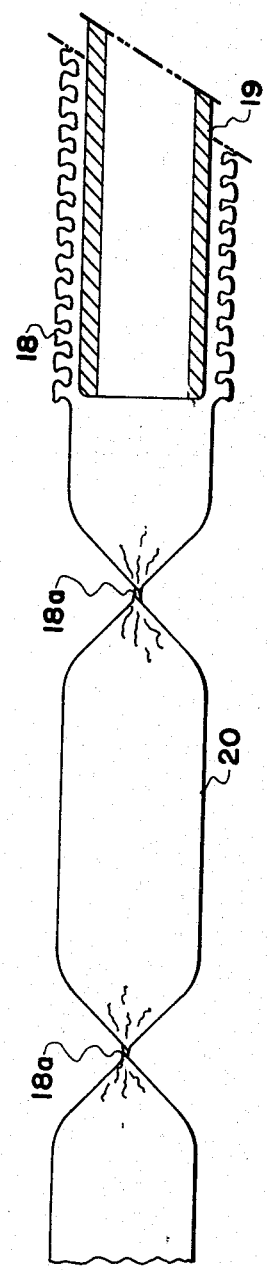
FIG. 3 is a schematic view showing the filling of the casing with sausage meat on an extrusion horn or nozzle and the preparation of sausage links therefrom.

After the casing is shirred into individual short strands, it is packaged and, optionally, may be cured by heating at 60–80° C. in an atmosphere of 20–50 percent relative humidity for several hours prior to shipment to the meat packer. In FIG. 3, the stuffing of the casing is illustrated. A strand of edible phosphate-glutaraldehyde tanned collagen casing 18 is placed on a tubular stuffing horn 19 which is connected to a pressurized source of sausage emulsion (not shown). The sausage emulsion is passed through stuffing horn 19 to the end of casing 18 and the casing is filled with sausage meat and twisted at suitable intervals, as indicated at 18a, to provide sausage links 20. The links may be severed from each other and packaged in a suitable overwrap following conventional meat packaging techniques. Alternatively, the links may be packaged in an unsevered string. When the sausage is cooked by the consumer, the casing is found to be quite strong and shrinks with the meat during cooking. The casing may be pre-stuck, if desired, to permit more rapid release of fat during the cooking of the sausages. Casing which is prepared in this manner has been found to have a shrinkage temperature which is equal to or greater than native collagen and thus does not shrink excessively during cooking. The casing is easy to form into links, stuffs easily without excessive breakage, and cooks well without excessive splitting or sticking to the frying pan.

The following nonlimiting examples are illustrative of the application of this invention to the preparation of a satisfactory edible collagen casing.

Example 1

In this example, the preparation of edible collagen casings from limed animal hides with a combined phosphate-glutaraldehyde tanning is illustrated. Selected cow hides from carcasses certified fit for human consumption, weighing about 65–75 lbs. each are the starting material for this process.

As soon as possible after flaying and inspection, the hides are washed in a large volume of circulating cool (10° C.) water to remove adhering blood. After washing, the hides are fleshed fresh, without curing to remove adhering fatty and muscular debris from the flaying operation.

The washed and fleshed hides are then treated in a liming bath consisting of 6% wt. of fresh calcium hydroxide and 1.5% wt. of sodium sulfhydrate (the liming bath may contain up to 3% dimethylamine sulfate), as solution and/or slurry contained in about 450% wt. of water at room temperature (15°–20° C.), all percentages being calculated on the weight of the hide treated. The treatment is carried out for a period less than about 6 hours, sufficient to remove most of the hair from the hide, and the hides are gently agitated from time to time to insure more even pentration of the liming liquor.

After liming, the hides are removed from the liming bath and permitted to drain for a period of ½ hour while suspended. The limed halides are then gently squeezed, as between rubber rollers, to remove excess liming liquor.

The hides which have been thus limed, drained, and squeezed, are then cut or split in the plane of the hide into two approximately equal portions by weight. The upper or outer hide surface contains all of the hair, hair follicles, sebaceous and sudorific glands. The inner or corium layer consists substantially of collagen. The outer or hair containing layer or split is discarded as unsuitable for use in the preparation of casing but may be used for formation of leather laminates or coverings.

The corium layer or split is then placed in a tank or vat containing about 4.5 times the hide weight of water at a temperature less than about 15° C. Gentle agitation is used to insure even removal of debris and of adhering lime solution and/or slurry. The hides are washed during a period of 20–30 minutes. The washings are removed and the corium splits resuspended in 4.5 times their weight of cool (15° C.) water. Edible grade lactic acid, suitably diluted at a concentration of 2–4 ounces of 44% lactic acid per quart of cool (15° C.) water is added in small portions at 15 minutes intervals, with gentle agitation for 5 minutes of each 15 minute period. The liquor is tested for pH before each addition, and the end point is regarded as the point when the pH is permanently depressed below 7.0. In general, this requires about 1.5% of 44% lactic acid, based on the weight of the corium splits. This treatment is effective to neutralize the excess lime in the corium layer and to remove it as a soluble salt. The rate of addition of the lactic acid solution is carefully regulated so that the temperature of the bath is never permitted to rise above about 32° C.

The neutralized and delimed corium splits are then removed from the neutralization bath, drained, and rinsed in cool (15° C.) water, packed into polyethylene bags which are in turn placed in 50-gallon fiber drums. Dry Ice in sufficient quantity is placed above and below the polyethylene bags to chill the prepared collagen to maintain it below 5° C. during storage and/or shipment prior to comminution and acid swelling operations in preparation for extrusion. It should be noted, however, that the hides may, if desired, be cut into small pieces or small pieces of scrap hide material may be used in the steps of liming, splitting, and neutralization or deliming.

The delimed corium splits are cut into small square or rectangular sections, e.g. ¼ to 4 inches on a side, in preparation for grinding. The small pieces of treated hide are converted to a fine pulp by successive passes through a meat grinder. In this grinding operation, sufficient ice is mixed with the hide splits to maintain the temperature below about 20° C. (and preferably below about 10° C.). Successive passes through the meat grinder use successively smaller dies, the smallest being about ³⁄₆₄ inch. At this point, sufficient water is added to the pulp to produce a mixture consisting of about 90% water and 10% collagen.

The collagen pulp is then treated with sufficient dilute lactic acid (other dilute or weak acids such as citric or acetic acid may be used) to produce a pH of about 2.5–3.7. The acid is usually added as a dilute solution, e.g., about 0.8–2.0%. After thorough mixing, the pulp and acid are stored overnight at a temperature of about 3° C. to swell. At the end of this time the collagen is swollen and and have taken up all of the water in the slurry. The swollen collagen is mixed with sufficient water and acid to maintain the pH of 2.5–3.7, thus producing a thin homogeneous paste consisting of about 4% collagen and 1.2% lactic acid.

The swollen collagen slurry is passed through a homogenizer to further disperse the fibers and then is filtered to remove any undispersed fiber clumps or other solid contaminates. The paste is generally deaerated by storage under vacuum prior to extrusion. The process, from the washing of the limed hide through the acid swelling of the comminuted collagen, is preferably carried out in a period of about 6–12 hours and generally no longer than 48 hours.

The homogenized and filtered collagen slurry is then pumped under pressure through the extrusion die as previously described, into a coagulating bath consisting of about 40% ammonium sulfate (sodium sulfate can also be used) in water. When the collagen is extruded as a thin-walled tube into this concentrated solution of ammonium sulfate, the collagen fibrils are dehydrated and collapse to form a film which is sufficiently coherent for further processing. As shown in FIG. 1 of the drawings, the coagulation bath is circulated both inside and outside the tube to maintain the tube in an inflated condition and to insure proper coagulation of the casing both on the inside and outside.

The casing is next passed through a saturated solution of monosodium dihydrogen phosphate and then through a wash bath of 20% monosodium dihydrogen phosphate to remove a substantial amount of the ammonium sulfate coagulant from the coagulated film.

From the wash bath, the casing next passes into a tanning bath comprising an aqueous solution containing 20% monosodium dihydrogen phosphate and 0.2% glutaraldehyde. In each of the baths where a solution containing monosodium dihydrogen phosphate is specified it is possible to use solutions of trisodium phosphate or disodium monohydrogen phosphate provided that the solution is buffered to a pH 4–6, which in effect converts the phosphate in solution to the more acidic form.

From the tanning bath, the casing passes through a wash bath containing 10% disodium monohydrogen phosphate and then through one or more wash baths to remove all unreacted coagulating or tanning or hardening reagents. The casing is then passed through a plasticizing bath consisting of an aqueous solution of glycerin (or an equivalent plasticizer such as sorbitol, dipropylene glycol, triethylene glycol, etc.). The plasticizing bath introduces a substantial amount of the desired plasticizer into the casing, which prevents it from becoming hard and brittle after drying.

From the plasticizing bath, the casing passes through a dryer where it is inflated and dried with the aid of heated air circulated by a fan or blower as previously described. Upon leaving the dryer, the casing is partially rehumidified, rolled up on reels, and then shirred on a machine similar to the type used in the shirring of regenerated cellulose casings. Alternatively, the casing may be shirred directly out of the dryer. After the casing is shirred into individual short lengths, it is packaged in suitable cartons. Optionally, the casing may be cured after packaging by heating at about 80° C. in an atmosphere of 20–50% relative humidity for several hours prior to shipment to the meat packer.

When this casing is used by the meat packer in a shirred form as illustrated in FIG. 3 and stuffed with sausage meat and formed into lengths as shown in FIG. 4, a satisfactory sausage product is obtained. The casing functions well in stuffing and is formed easily by the linking machinery into the desired sausage links. When the sausages are cooked, the casing is known to shrink with the meat and to release fat cooked out. There is no excessive tendency of the casing to split or to stick to the frying pan during cooking.

Example 2

In this example, the frozen steer hides are substituted for fresh cattle hides in the process. The frozen steer hides are thawed and limed as described in the previous example. All other processing steps are as described in Example 1 up to the point of extrusion of the collagen slurry into the coagulation bath.

The acidic swollen collagen slurry, prepared as described in Example 1, is extruded into a coagulating bath consisting of a saturated solution of monosodium dihydrogen phosphate (or other phosphate salt buffered to pH 4–6). The casing passes from the coagulating bath into a first wash bath comprising an aqueous solution containing 20% monosodium dihydrogen phosphate.

Next, the casing passes from the wash bath into a hardening or tanning bath comprising an aqueous solution of 20% monosodium dihydrogen phosphate and 0.1% glutaraldehyde.

After tanning, the casing is passed through a first wash bath containing 20% monosodium dihydrogen phosphate and then a second wash bath containing 20% disodium monohydrogen phosphate at a temperature of about 20°–30° C. The casing is then passed through a series of ordinary water wash tanks to remove all salts therefrom. After washing, the casing is passed through a plasticizing bath comprising an aqueous solution containing 5% glycerin and is then finally dried, reeled, shirred, and packaged.

The casing produced in accordance with this example possesses excellent wet, dry, and rewet strengths. The casing exhibits excellent stuffing, linking, and frying properties and is easily shirred and deshirred.

Example 3

The improvement in stuffing, linking, and cooking properties obtained by tanning collagen casing with a combined phosphate-glutaraldehyde tanning is also obtained when such a tanning process is used in the treatment of casing prepared from unlimed collagen (or from hides which has been enzymatically dehaired).

Selected steer hides from carcasses fit for human consumption, weighing about 65–75 lbs. each, are the starting material for this process. As soon as possible after flaying and inspection, the hides are washed in a large volume of circulating cool (10° C.) water to remove adhering blood. After washing, the hides are fleshed fresh without curing to remove adhering fatty or muscular debris from the flaying operation.

The washed and fleshed hides are then treated in dilute acetic acid for several deys to partially swell the hide and loosen the hair. After the acetic acid treatment, the hides are split or cut in the plane of the hide into two approximately equal portions by weight, the upper or outer hide surface contains all of the hair, hair follicles, sebaceous and sudorific glands. The inner or corium layer consists substantially of collagen. The outer or hair containing layer or split is discarded as unsuitable for use in the preparation of casing, but may be used for the preparation of leather laminates or coverings.

The corium split is then neutralized in a dilute solution of sodium bicarbonate. The hides are then washed and cut into small sections as described in Example 1. The pieces of corium splits are then converted into a fine pulp by successive passes through a meat grinder. The pulp is placed with lactic acid as described in Example 1, to cause it to swell to prepare a slurry suitable for extrusion. The slurry is then homogenized and filtered and extruded, tanned, plasticized, dried, reeled, and shirred, all as described in Example 1.

The casing which is obtained in this manner by a combined phosphate-glutaraldehyde tanning has satisfactory wet, dry, and rewet strength, and has satisfactory stuffing, linking, and cooking properties, as described for the casing produced in accordance with the Example 1.

Example 4

A collagen slurry prepared in accordance with Example 1 is extruded through an annular die into a coagulation bath consisting of a saturated solution of ammonium sulfate containing 1% ammonium hydroxide. From the coagulation bath the casing is passed through a second coagulation bath consisting of a saturated solution of ammonium sulfate and then through a saturated solution of monosodium dihydrogen phosphate. From the last mentioned bath the casing is passed through a 20% aqueous solution of sodium dihydrogen phosphate and then into a tanning bath consisting of an aqueous solution of 20% monosodium dihydrogen phosphate containing 0.5% glutaraldehyde.

The tanned casing from the phosphate-glutaraldehyde tanning bath is washed first in a 20% aqueous solution of monosodium dihydrogen phosphate and then in a 20% aqueous solution of disodium monohydrogen phosphate. The casing is then passed through a series of water-wash baths and finally through a plasticizing bath comprising a 5% solution of glycerin in water containing a small amount of an acetylated monoglyceride emulsified therein. The casing is then dried, shirred, and packaged as described above. The casing prepared in this manner has adquate strength for processing, shirring, and stuffing, and has excellent properties required for linking, stuffing, and cooking.

Example 5

The procedure described in Example 4 is repeated with a slight variation in the composition of certain of the treating baths. The process is carried out as described in Example 4 with an increase in the amount of glutaraldehyde used in the tanning bath. In this example the tanning bath consists of a 20% aqueous solution of monosodium dihydrogen phosphate containing 1% glutaraldehyde. Also, the second wash bath consists of a 10% solution of disodium monohydrogen phosphate. The remainder of the processing steps are as previously described.

The casing prepared in accordance with this example has adequate shirring, stuffing, linking, and cooking properties required in a commercially saleable casing.

Example 6

The procedure described in Example 4 is repeated with a slight variation in the composition of certain of the treating baths. In this example the first wash bath prior to the tanning bath contains only 10% monosodium dihydrogen phosphate rather than 20% as described in the previous example. The tanning bath comprises a 10% aqueous solution of monosodium dihydrogen phosphate containing 1% glutaraldehyde. The first wash bath following the tanning bath comprises a 10% aqueous solution of monosodium dihydrogen phosphate rather than 20% as in the previous example. The processing steps are otherwise identical to those described in Example 4.

The casing produced in this example has adequate shirring, stuffing, linking, and cooking properties required in a saleable edible collagen casing.

Example 7

The procedure described in Example 4 is repeated with an increase in the concentration of phosphate in the several wash baths and in the tanning bath. In this example, the treating bath immediately prior to the tanning bath comprises a 40% aqueous solution of monosodium dihydrogen phosphate. The tanning bath comprises a 40% aqueous solution of monosodium dihydrogen phosphate containing 1% glutaraldehyde. The first treating bath after the tanning bath comprises a 40% solution of monosodium dihydrogen phosphate. The final phosphate wash bath, however, contains only 10% disodium monohydrogen phosphate. The processing steps are otherwise identical to those described in Example 4.

The casing prepared in accordance with this example has shirring, stuffing, linking, and cooking properties adequate for a saleable edible collagen casing.

In the several examples set forth above, the collagen paste is extruded through an annular die into a coagulating salt bath. The coagulating salt bath may be ammonium sulfate or sodium sulfate or an acid phosphate salt. The coagulating bath is preferably maintained at a pH in the range from about 4–6 and is a substantially saturated solution. It is necessary to use a very concentrated solution in order to effect the necessary coagulation of the collagen and formation of a coherent tubular film. The intermediate treating baths between the coagulation bath and tanning bath are moderately concentrated solutions of acid phosphate salts. The tanning solution is a moderately concentrated solution of an acid phosphate salt containing a small amount of glutaraldehyde. In each case, the monosodium dihydrogen phosphate is preferred as the acid phosphate salt but a disodium or trisodium phosphate salt could be used if acidified to a pH in the range of 4–6. The glutaraldehyde content of the tanning bath is not critical and may vary from about .05 to 5%. The use of the glutaraldehyde as a tanning component in an acid phosphate salt results in an improved tanning action without the resulting discoloration which occurs when the glutaraldehyde is used in simple aqueous solution.

While this invention has been described fully and completely with special emphasis upon several preferred embodiments, it should be understood that within the scope of the appended claims the invention may be practiced otherwise than as specifically described herein.

What is claimed is:
1. A method of preparing an edible tubular collagen casing which comprises:
  (a) extruding an acid swollen collagen slurry through an annular die into a coagulating bath, comprising a substantially saturated solution of an alkali metal sulfate or ammonium sulfate or an alkali metal acid phosphate, to form a collagen tube,
(b) washing excess coagulating salt from the coagulated collagen tube in a bath comprising a dilute acid solution of a phosphate salt,
(c) tanning the collagen tube by passing the same through an aqueous solution of an acid phosphate salt at a pH of 4–6 containing 0.05–5.0% glutaraldehyde, and
(d) washing to remove excess salts and tanning agents and drying the tube to produce a translucent, non-fibrous, edible casing.

2. A method in accordance with claim 1 in which the tanned casing is passed through at least one treating bath comprising an aqueous solution of an alkali metal acid phosphate and then a water wash followed by treatment in a plasticizing bath comprising an aqueous solution of glycerin prior to drying.

3. A method in accordance with claim 1 in which the collagen slurry is prepared by:
(a) treating a fresh or frozen or salt cured animal hide to remove the flesh, and fatty and muscular debris,
(b) mechanically splitting the hide to remove the hair and epidermal layer,
(c) grinding the corium split at a temperature less than about 20° C. to produce a slurry of finely divided collagen in water, and
(d) treating the slurry with acid at a pH of 2.5–3.7 to produce an acid swollen collagen slurry suitable for extrusion.

4. A method in accordance with claim 3 in which the animal hide is treated with a lime-containing solution for a time sufficient to at least partially dehair the hide, and is then thoroughly washed to remove excess lime prior to mechanical splitting.

5. A method in accordance with claim 3 in which the animal hide is subjected to treatment with dilute acid to partially depilate the hide prior to mechanical splitting.

6. A method in accordance with claim 3 in which the slurry contains 2–6% collagen.

7. An edible translucent casing comprising cohered limed or unlimed hide collagen fibrils tanned or hardened in an aqueous solution containing a 0.05–5% glutaraldehyde and an alkali metal acid ortho phosphate at a pH of 4–6.

8. A sausage casing in accordance with claim 7 in a shirred condition.

9. An edible sausage comprising a sausage casing in accordance with claim 7, stuffed with a sausage meat.

References Cited

UNITED STATES PATENTS

| | | |
|---|---|---|
| 2,971,814 | 2/1961 | Seligsberger. |
| 3,034,852 | 5/1962 | Nishihara. |
| 3,071,477 | 1/1963 | Klevens _____ 99—176 |
| 3,373,046 | 3/1968 | Fagan _____ 99—175 |
| 3,408,916 | 11/1968 | Cohly et al. _____ 99—176 |
| 3,413,130 | 11/1968 | Rose _____ 264—209 X |

FRANK W. LUTTER, Primary Examiner

R. HALPER, Assistant Examiner

U.S. Cl. X.R.

264—202, 209

UNITED STATES PATENT OFFICE
CERTIFICATE OF CORRECTION

Patent No. 3,533,809          Dated   October 13, 1970

Inventor(s)  Mauj A. Cohly, et. al.

It is certified that error appears in the above-identified patent and that said Letters Patent are hereby corrected as shown below:

Column 1, line 34, "casing" should read -- casings -- ; line 56, "a" should read -- as -- . Column 2, line 26, after "3,408,918", insert a comma -- , -- ; line 32, after "3,425,846", insert a comma -- , -- . Column 3, line 1, after "3,413,130", insert a comma -- , -- ; line 30, "acided" should read -- acidic -- . Column 4, line 18, "impartant" should read -- important -- . Column 6, line 54, "halides" should read -- hides -- . Column 9, line 7, "has" should read -- have -- ; line 17, "deys" should read -- days -- .

Signed and sealed this 12th day of December 1972.

(SEAL)
Attest:

EDWARD M.FLETCHER,JR.                ROBERT GOTTSCHALK
Attesting Officer                    Commissioner of Patents